United States Patent Office 2,926,142
Patented Feb. 23, 1960

2,926,142

SURFACE ACTIVE ALKYL BENZENE SULFONATE COMPOSITION AND METHOD OF PREPARATION

Edwin J. Eccles, Winchester, and Robert J. O'Neill, Stoneham, Mass., assignors to Monsanto Chemical Company, St. Louis, Mo., a corporation of Delaware No Drawing. Application February 24, 1956
Serial No. 567,461

15 Claims. (Cl. 252—161)

The present invention relates to a novel detergent composition and the process for preparing same. More specifically this invention relates to a surface active composition, which is predominantly a combination of certain alkylbenzene sulfonates, having improved properties.

The higher alkylbenzene sulfonates, in general, and the compositions prepared by the alkylation of benzene with olefins, such as the polypropylenes, and subsequently monosulfonated and neutralized, in particular, are well known surface active agents. A large quantity of olefin dodecylbenzene sulfonate, wherein the olefin is a tetrapropylene, is produced and is generally marketed as a solid particulate detergent composition containing substantial quantities of sodium sulfate and/or other salts, which composition may be used per se or is subsequently further formulated to obtain the desired properties. These compositions are normally dried by conventional drum drying or spray drying procedures.

Certain uses of the alkylbenzene sulfonates require the surface active agents to be substantially free of salts, which materials may also be marketed as a dried product, but the tendency to cake, which makes subsequent handling difficult, gives a preference for marketing these materials as aqueous solutions, e.g. containing about 30 percent solids or as aqueous pastes containing from about 60 to 65 percent solids.

Heretofore in the production of olefin dodecylbenzene it has been the practice to effect a separation of the reaction mixture obtained from the Friedel-Crafts alkylation of benzene with a tetrapropylene, whereby the excess benzene is first recovered, then a low-boiling intermediate fraction is obtained, after which the dodecylbenzene fraction is recovered at a relatively narrow cut, and the polyalkylbenzenes, fused-ring products and high-boiling aliphatic hydrocarbon components remain in the residue. The dodecylbenzene fraction has then been sulfonated and neutralized to produce the dodecylbenzene sulfonates of commerce. The low-boiling intermediate fraction is used as a mixed solvent, but in general does not command an adequate price to pay its way. Furthermore it has not been practical to effect any separation of the components of this mixture as the value of the products is offset by the cost of processing. Accordingly, this fraction has been regarded as an economic loss in the alkylation reaction.

The principal object of this invention is to produce a novel improved surface active composition utilizing a mixture of dodecylbenzene and the intermediate fraction from the Friedel-Crafts alkylation of benzene with a tetrapropylene, which after joint monosulfonation with sulfur trioxide and neutralization thereof provides a composition having advantageous properties. Another object of this invention is to provide a substantially salt-free surface active composition from a novel mixture of hydrocarbons, which composition is uniform at normal storage conditions, i.e. does not separate into two phases to any substantial degree. Still another object of this invention is to provide a high-solid content aqueous paste of a surface active composition. A further object is to provide a new surface active composition having a reduced viscosity, pour point, and cloud point. A still further object is to provide a new surface active composition of equivalent or superior detergency and wetting properties to the sodium dodecylbenzene sulfonates.

It has now surprisingly been found that up to about 25 weight percent of the intermediate fraction can be mixed with the dodecylbenzene fraction to produce a surface active composition possessing a number of advantageous properties. Accordingly this in effect upgrades the value of the intermediate to the level of the dodecylbenzene.

The low-boiling intermediate fraction has not been critically characterized as to the chemical components contained therein, but generally comprises a mixture of about 50 weight percent of lower alkylbenzenes wherein the alkyl radical ranges from about 4 to about 9 carbon atoms and predominantly averages about 5 carbon atoms, and about 50 weight percent of saturated hydrocarbons containing from about 5 to about 10 carbon atoms, e.g. saturated fragmentation products such as the lower alkanes and alicyclic hydrocarbons produced by cyclization of the fragmentation products, etc. Some approximate physical characteristics of this mixture of aromatic and aliphatic hydrocarbons can be indicated, such as: the specific gravity, 15.5/15.5° C., is in the range of from about 0.80 to about 0.82; the refractive index, $N_D$ 25° C. is in the range of from about 1.4500 to about 1.4570; the distillation range is from about 150° to about 215° C. with about 90 percent of the material distilling in the range of from about 170° to about 210° C.; and the apparent average molecular weight of the aromatic portion determined by nitration is from about 150 to about 160.

Hereinafter the term "intermediate" will be understood to mean the above-characterized mixture of low-boiling hydrocarbons obtained in the Friedel-Crafts alkylation of benzene with a tetrapropylene.

The process by which the novel surface active compositions of this invention can be prepared may be briefly summarized as follows. A composition consisting of up to about 25 weight percent, and more specifically from about 10 to about 17 weight percent, and preferably about 15 weight percent of the intermediate with a dodecylbenzene hydrocarbon fraction is mixed by any suitable means and introduced into a jacketed sulfonator vessel, or can be directly mixed therein. Thereafter the aforesaid hydrocarbon mixture is sulfonated by the uniform introduction of a mixture of sulfur trioxide and an inert carrier therefor, e.g. dry air, nitrogen and the like, in a volume ratio of from about 5:1 to about 15:1 and preferably about 10:1 and at a rate which will provide an amount of sulfur trioxide equivalent to from about 1.00 to about 1.05 moles of sulfur trioxide per mole of the sulfonatable hydrocarbon to effect a finished product which will have a favorably low color, the sulfur trioxide-inert carrier gas mixture being introduced to the sulfonator through a sub-surface feed line into the vigorously agitated hydrocarbon mixture. The sulfonation time and temperature can be varied somewhat, but is preferably maintained for from about 2 to about 6 hours' reaction time at a temperature of from about 30° to about 70° C. Where a substantially salt-free product is desired, the mixed sulfonic acids can then be reacted with a small amount, from about 0.5 to about 3 weight percent, of a primary alcohol, preferably ethylene glycol, which reacts with any dissolved or complexed sulfur trioxide to prevent the formation of the alcohol-insoluble sodium sulfate during the subsequent neutralization. Where alcohol treatment is employed, a reaction time of from about 15 to about 30 minutes has been found satisfactory. The mixed sulfonic acids are then neutralized by adding slowly into a closed jacketed vessel provided with an efficient agitating means and containing a caustic solution of about 25 percent sodium hydroxide in an amount to provide a neutralized product mixture having a pH of from about 7 to about 7.5. Other alkali metal hydroxides such as potassium hydroxide, lithium hydroxide, or ammonium hydroxide can be employed to neutralize the mixed sulfonic acids and provide the corresponding alkali metal sulfonates. The temperature of the neutralization reaction is held between about 40° and about 70° C. and preferably at about 50° C. by controlling the rate of addition of the sulfonic acid and the rate of heat removal from the vessel by the cooling means. Thereafter the neutralized mixed composition can be treated with a sodium hypochlorite solution, as desired, to improve the color and storage properties of the mixed alkali metal alkylbenzene sulfonates. The final composition is then preferably adjusted to a pH of from about 7.5 to about 9. The surface active composition in the form of about a 65 percent solids paste is then drummed or stored in other suitable vessels for shipment to the customer.

The following examples are illustrative of this invention.

Example 1

A mixed hydrocarbon containing 850 parts by weight of dodecylbenzene and 150 parts by weight of intermediate was sulfonated with 334 parts by weight sulfur trioxide in combination with dry air in the ratio by volume of 1 part sulfur trioxide per 10 parts of dry air, which gaseous mixture was introduced uniformly into the agitated mixed liquid hydrocarbons over a period of 2 hours. The temperature of the reaction mass was maintained between about 40° to 50° C. during the sulfonation. Thereafter 14 parts by weight of ethylene glycol was added to the mixed sulfonic acids.

Then 450 parts by weight of the above mixed sulfonic acids was neutralized by feeding into a well-agitated solution of 55 parts by weight of sodium hydroxide dissolved in 187 parts by weight of water over a period of about 40 minutes and at a temperature of about 55° to about 70° C. The pH was then adjusted to about 7 by the addition of a small quantity of 50 percent sodium hydroxide solution. Thereafter the neutralized composition was bleached by the addition of 8.2 parts by weight of a 10 percent sodium hypochlorite solution. The final paste concentration was found to be 66 percent solids. The specific gravity was 0.91. No separation was noted for this composition, as more fully exemplified below.

It was found that with separate sulfonation of the dodecylbenzene and intermediate fractions and subsequent mixing of the sulfonic acids and joint neutralization thereof that the paste composition was non-uniform, i.e. separated into two layers. This was found to be the case even when a substantial amount of the unsulfonated oil was removed from the intermediate fraction subsequent to sulfonation and prior to mixing and neutralization. Thus, it was observed that when dodecylbenzene and the intermediate fraction were separately sulfonated with sulfur trioxide, then mixed in a ratio of from 75 to 90 parts by weight of the dodecylbenzene sulfonic acid and 25 to 10 parts by weight of the intermediate sulfonic acids, such that the mixture consists of 100 parts, and neutralized, that in each instance an immiscible liquid layer separated from the main portion of the paste. In contradistinction thereto when the dodecylbenzene and intermediate were mixed before sulfonation with sulfur trioxide and subsequently neutralized it was found that no separation occurred.

| Example | Composition | Sulfonation Procedure | Paste Appearance* |
|---|---|---|---|
| 2 | 75 DDB:25 I | A | 17.4% Liquid layer. |
| 3 | 85 DDB:15 I | A | 15.4% Liquid layer. |
| 4 | 90 DDB:10 I | A | 6.2% Liquid layer. |
| 5 | 75 DDB:25 I | B | No separation. |
| 6 | 85 DDB:15 I | B | Do. |
| 7 | 88 DDB:12 I | B | Do. |

A = Separate sulfonation of fractions.
B = Joint sulfonation of fractions.
*Centrifuged at 1500 r.p.m. for 2.5 hours at 25-30° C. (about 200G).

It was also found that a small amount of separation might occur at high storage temperatures for the joint sulfonation product, but in all instances the amount of separation was materially less than in comparable compositions prepared by separate sulfonation and subsequent mixing and neutralization. Presumably part of the hydrocarbon fraction present in the intermediate fraction acts as a superior bridging solvent when the sulfonation is effected on the mixed hydrocarbons.

In addition the presence of the intermediate fraction lowers the viscosity of the mixed composition such that it is possible to market paste formulations of higher solids content. It is a general characteristic of the subject surface active materials to pass through a maximum viscosity stage during neutralization in the range of about 85 to about 90 percent neutralization, which range produces a peak power load, which must be within the capabilities of the mixing equipment. Thus the maximum solids content of the paste which may be handled without danger of stalling out the equipment will vary in part with the design of the machine, but for a given machine the use of the subject mixed composition will permit ready handling of higher-solids content pastes, e.g. for one apparatus it was found that a paste prepared from sodium dodecylbenzene sulfonate was restricted to an upper limit in the range of about 55 percent solids whereas the mixed sodium sulfonate product obtained by joint sulfonation of 85 weight percent dodecylbenzene and 15 weight percent intermediate permitted an upper limit in the range of about 65 percent solids. This advantage is apparent as the latter composition will permit a greater production rate with attendant cost reductions. Furthermore the presence of the intermediate effects an advantageous lowering of the pour point and cloud point of the sodium dodecylbenzene sulfonate mixed composition.

It is of interest to note that these economic and physical characteristic advantages are not obtained at the expense of the detergency and wetting values of the composition, but rather it was surprisingly found that the novel surface active composition of this invention was equivalent or superior to the product which did not contain any intermediate fraction. For example, a surface active composition consisting of the sodium sulfonate product of 85 weight percent of dodecylbenzene and 15 weight percent of intermediate (85 DDB:15 I) was prepared in the commercial apparatus and compared with the prior paste formulation prepared from 100 weight percent of sodium keryl-dodecylbenzene sulfonate (100 DDB) in the same apparatus with the following results:

| | 100 DDB | 85 DDB:15 I |
|---|---|---|
| Detergency—Gardinol | 99 | 112.6 |
| Draves-Clarkson Wetting: | | |
| 0.5% Conc | 5 sec | 4 sec |
| 0.25% Conc | 7 sec | 5 sec |
| 0.125% Conc | 15 sec | 10 sec |
| 0.0625% Conc | 42 sec | 28 sec |
| 0.031% Conc | >180 sec | >180 sec |

The surface active compositions of this invention are high-solids content aqueous pastes which are substantially salt-free, thus are essentially a paste composition of the active component employed in many commercial detergent formulations, etc. It is apparent that the paste can be diluted with water or specific organic solvents and/or can be formulated with various builders and other materials commonly found in detergent compositions, such as alkali metal sulfates, phosphates, polyphosphates, silicates, etc. Such detergent compositions can be employed as such or can be spray dried or drum dried to provide a particulate solid detergent.

We claim:

1. A mixed surface active composition comprising the substantially salt-free composition obtained by the sulfur trioxide sulfonation of a mixed hydrocarbon consisting of from about 10 to about 17 weight percent of the intermediate mixed hydrocarbon fraction obtained from the Friedel-Crafts alkylation of benzene with a tetrapropylene, characterized by a distillation range of from about 150° to about 215° C., and 90 to 83 weight percent of dodecylbenzene, prepared by the Friedel-Crafts alkylation of benzene with a tetrapropylene, said sulfur trioxide being diluted with an inert gaseous carrier in a volume ratio of from about 5 to about 15 volumes of carrier per volume of sulfur trioxide and furnished in an amount of from about 1.00 to about 1.05 mole equivalent sulfur trioxide per mole of the mixed sulfonatable hydrocarbons, said sulfonation being carried out between about 40° and about 70° C. for a time of from about 2 to about 6 hours, thereafter neutralizing the mixed hydrocarbon sulfonic acids by introducing into an aqueous alkali metal hydroxide solution in an amount sufficient to effect a pH of the mixed alkali metal hydrocarbon sulfonates of from about 7.5 to about 9, as determined in a 1 percent solution at 25° C.

2. A substantially salt-free mixed alkali metal hydrocarbon sulfonate surface active composition comprising from about 83 to about 90 weight percent of dodecylbenzene and 17 to 10 weight percent of the intermediate mixed hydrocarbon fraction obtained from the Friedel-Crafts alkylation of benzene with a tetrapropylene, characterized by a distillation range of from about 150° to about 215° C., a refractive index at 25° C. of from about 1.4500 to about 1.4570, and a specific gravity at 15.5° C. of from about 0.80 to about 0.82, which are jointly monosulfonated with sulfur trioxide and subsequently neutralized with an alkali metal hydroxide.

3. The composition of claim 2, wherein the mixed alkali metal hydrocarbon sulfonates are obtained from 85 weight percent of dodecylbenzene and 15 weight percent of intermediate.

4. The composition of claim 2, wherein the alkali metal hydroxide is sodium hydroxide.

5. The composition of claim 3 wherein the surface active composition is obtained as a paste containing at least 60 percent solids and the alkali metal hydroxide is sodium hydroxide.

6. The process of producing a substantially salt-free mixed alkali metal hydrocarbon sulfonate surface active composition comprising mixing from about 83 to about 90 weight percent of dodecylbenzene with from about 17 to about 10 weight percent of the intermediate mixed hydrocarbon fraction obtained from the Friedel-Crafts alkylation of benzene with a tetrapropylene, characterized by a distillation range of from about 150° to about 215° C., monosulfonating the mixture of dodecylbenzene and intermediate with sulfur trioxide diluted with an inert gaseous carrier in a volume ratio of from about 5 to about 15 volumes of carrier per volume of sulfur trioxide, and then neutralizing the mixed hydrocarbon sulfonic acids by introducing into an aqueous alkali metal hydroxide solution in an amount sufficient to effect a pH of the mixed alkali metal hydrocarbon sulfonates of from about 7.5 to about 9, as determined in a 1 percent solution at 25° C.

7. The process of claim 6, wherein the dodecylbenzene and intermediate are obtained from the Friedel-Crafts alkylation of benzene with a tetrapropylene and the intermediate fraction is characterized by a distillation range of from about 150° to about 215° C., a refractive index at 25° C. of from about 1.4500 to about 1.4570, and a specific gravity at 15.5° C. of from about 0.80 to about 0.82, the sulfur trioxide is employed in an amount of from about 1.00 to about 1.05 mole equivalent sulfur trioxide per mole of the mixed sulfonatable hydrocarbons and the sulfonation is carried out at from about 40° to about 70° C. for from about 2 to about 6 hours, and the neutralization reaction is carried out at from about 40° C. to about 70° C.

8. The process of claim 7, wherein the hydrocarbon mixture is 85 weight percent of dodecylbenzene and 15 weight percent of intermediate.

9. The process of claim 8, wherein the alkali metal hydroxide is sodium hydroxide.

10. The process of claim 8, wherein the alkali metal hydroxide is potassium hydroxide.

11. The process of claim 8, wherein the alkali metal hydroxide is lithium hydroxide.

12. The process of claim 8, wherein the alkali metal hydroxide is ammonium hydroxide.

13. The process of claim 9, wherein the mixed hydrocarbon sulfonic acids are treated with from about 0.5 to about 3 weight percent of ethylene glycol prior to neutralization.

14. The process of claim 9, wherein the concentration of the sodium hydroxide solution is such as will provide a final paste composition containing at least about 60 percent solids.

15. The process of claim 9, wherein the sulfur trioxide is employed in a ratio of 10 volumes of dry air per volume of sulfur trioxide.

References Cited in the file of this patent

UNITED STATES PATENTS

| | | |
|---|---|---|
| 2,477,383 | Lewis | July 26, 1949 |
| 2,615,847 | Thompson | Oct. 28, 1952 |
| 2,703,788 | Morrisroe | Mar. 8, 1955 |